United States Patent [19]

Honeywell et al.

[11] 4,432,505

[45] Feb. 21, 1984

[54] LEAD TAPE PULLER AND METHOD

[76] Inventors: Edward W. Honeywell, 1237 S. Ninth Ave., Arcadia, Calif. 91006; Joseph C. Honeywell, R.R. 2, Box 1006, Sand Spring, Okla. 74063

[21] Appl. No.: 340,315

[22] Filed: Jan. 18, 1982

[51] Int. Cl.$^3$ ...................... B65H 69/06; G03D 15/04
[52] U.S. Cl. .................. 242/56 R; 242/58.4; 226/95
[58] Field of Search ............ 242/56 R, 58.4, 58.5, 242/48, 182, 195, 197, 198, 199; 226/91, 92, 95; 156/506, 505, 502, 304.3, 157, 159; 360/95; 406/151, 152; 271/98, 99, 100

[56] References Cited

U.S. PATENT DOCUMENTS

| | | | |
|---|---|---|---|
| 3,552,741 | 1/1971 | Staines | 271/98 |
| 3,690,644 | 9/1972 | Halbert | 271/98 |
| 3,737,358 | 6/1973 | King | 242/56 R X |
| 3,780,960 | 12/1973 | Tokuno et al. | 226/95 X |
| 3,854,674 | 12/1974 | Herger et al. | 242/186 X |
| 3,863,863 | 2/1975 | Ende | 242/182 |
| 3,888,480 | 6/1975 | Bagozzi | 242/56 R |
| 3,940,080 | 2/1976 | Bennett | 242/58.4 X |
| 4,113,196 | 9/1978 | Rehklau | 242/56 R |
| 4,114,252 | 9/1978 | Kon et al. | 242/56 R X |
| 4,210,266 | 7/1980 | Schoettle et al. | 242/56 R X |
| 4,216,052 | 8/1980 | Zielke | 242/56 R X |
| 4,298,152 | 11/1981 | Austin | 226/95 |
| 4,328,065 | 5/1982 | Kincheloe et al. | 242/56 R X |

Primary Examiner—Stuart S. Levy
Assistant Examiner—Scott J. Haugland
Attorney, Agent, or Firm—Gordon L. Peterson

[57] ABSTRACT

A lead tape puller comprising a housing, a passage in the housing, a piston slidable in the passage of the housing, and a retraction member coupled to the piston and movable with the piston between extended and retracted positions. A passage is provided within the piston and the retraction member, with the passage opening on one side of the piston and having a port on the other side of the piston. The piston and retraction member can be moved by differential fluid pressure acting on the piston to the extended position where the port is adjacent the leader of tape within a cassette. Subatmospheric pressure is then applied to one side of the piston, and this subatmospheric pressure acts on the leader through the passage means and the port to tend to draw the leader into the port. This at least partially closes the passage means to restrict air flow through the passage. This valving action of the port and the leader is used to assist in moving the piston and retraction member to the retracted position.

17 Claims, 9 Drawing Figures

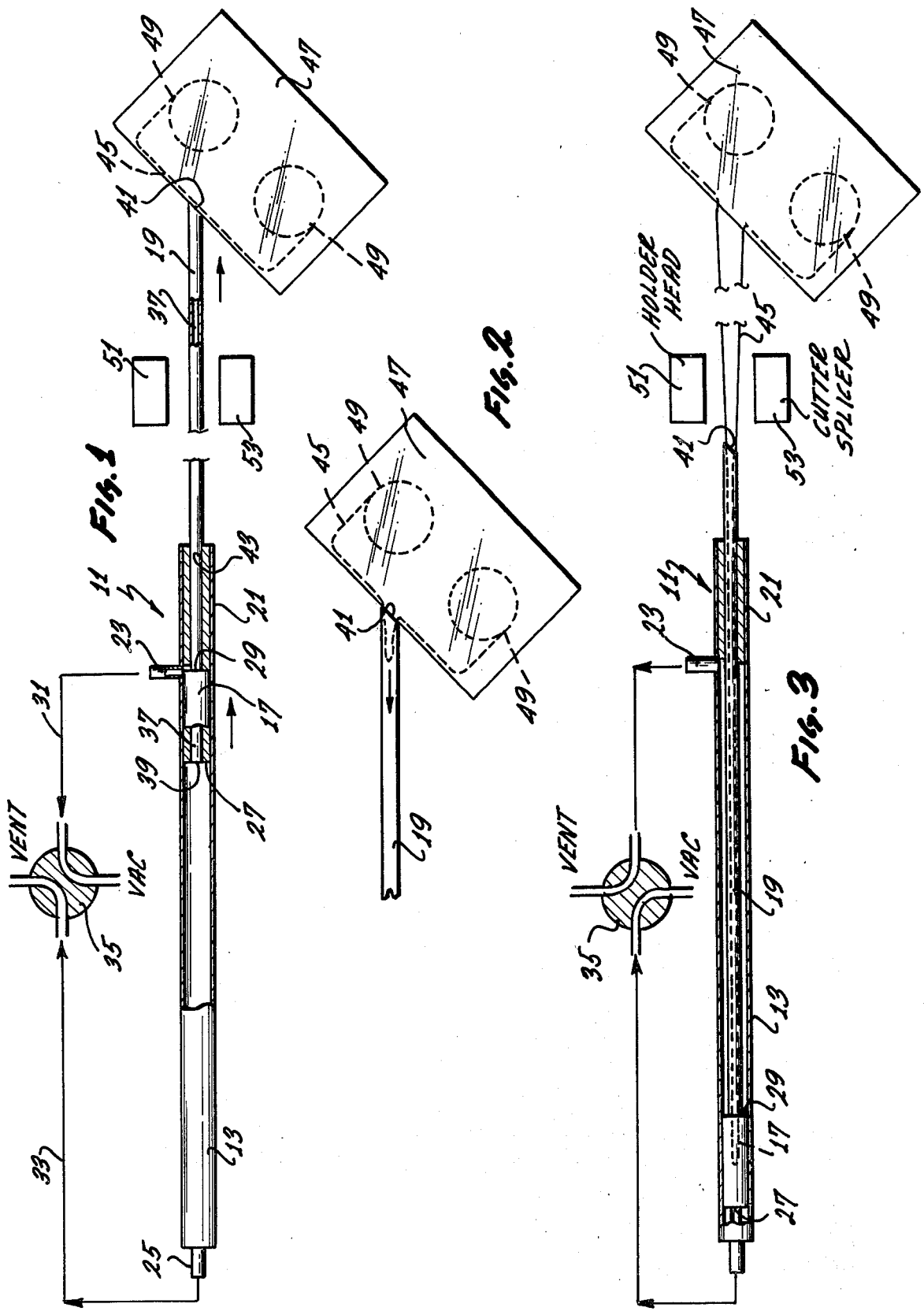

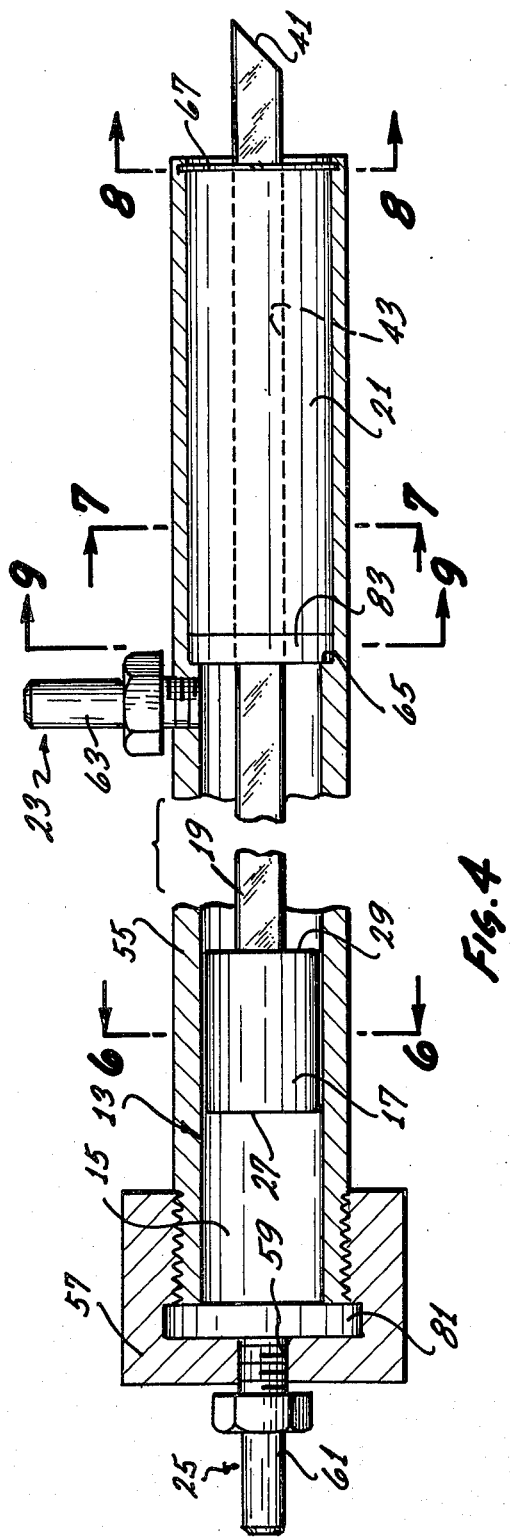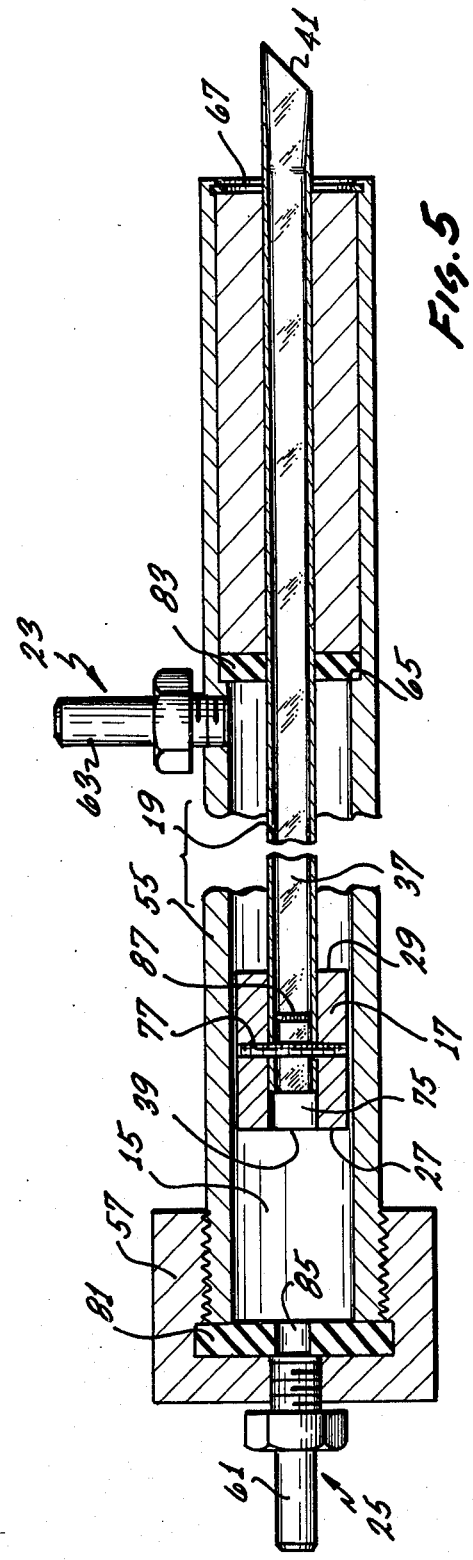

LEAD TAPE PULLER AND METHOD

BACKGROUND OF THE INVENTION

This invention relates to a lead tape puller for withdrawing the lead tape or leader from blank magnetic tape cassettes.

Magnetic tape is often provided within a cassette, with the tape being wound on two reels within the cassette. In order to wind the magnetic tape on the reels, the cassette is typically provided with a relatively short length of leader which is wound on the reels. The leader is retracted from the cassette, with the ends of the leader remaining attached to the two reels. The leader is then cut and magnetic tape is attached to the two ends of the leader. The leader and tape are then rewound on the reels to provide a standard cassette loaded with magnetic tape.

It is known to use vacuum pressure to withdraw the leader from the cassette. Vacuum leader retraction devices are shown, by way of example, in Bagozzi U.S. Pat. No. 3,888,840, Zielke U.S. Pat. No. 3,848,825, Bennett U.S. Pat. No. 3,940,080, King U.S. Pat. No. 3,997,123, and Bosco U.S. Pat. No. 4,136,838.

SUMMARY OF THE INVENTION

This invention provides a lead tape puller in which subatmospheric pressure is used to withdraw the leader from the cassette. However, with this invention, the leader being withdrawn from the cassette is used as a valve closure member to close a port which automatically brings about the desired withdrawal of the leader from the cassette. Thus, the workpiece, i.e., the leader, is made to be, in effect, an operative part of the lead tape puller. In addition, because the leader is used as a valve closure, rapid response and proper timing of the withdrawal movement are assured.

For example, the lead tape puller may advantageously include a housing having a passage therein, a piston slidable in the passage of the housing and a retraction member coupled to the piston and movable with the piston between extended and retracted positions. The retraction member extends out of the housing at least when the piston and retraction member are in the extended position.

To permit subatmospheric pressure to be applied to the leader, passage means is provided in the piston and the retraction member. The passage means opens on one side of the piston and has a port in the retraction member on the other side of the piston.

The piston and retraction member are preferably moved between the extended and retracted positions by applying differential fluid pressure across the piston. Preferably, the fluid is a gas, such as air. The differential pressure is preferably created by using subatmospheric pressure and atmospheric pressure. Subatmospheric pressure has the advantage of being used, not only to assist in creation of the differential fluid pressure across the piston, but also to create the necessary force to withdraw the leader from the cassette. Atmospheric pressure has the advantage of being free in that no equipment is required to create it. Of course, various other force systems, such as springs, may be utilized to drive, or assist in driving, the piston and retraction member.

In use, the piston and retraction member are moved to the extended position in which the port is adjacent the leader. Subatmospheric pressure is then applied to one side of the piston and through the passage means and the port to tend to draw air through the port and the passage means. This pulls the leader toward the port. The leader at least partially closes the passage means to restrict airflow through the passage means to thereby reduce the pressure on one side of the piston. Accordingly, by applying air at a pressure greater than subatmospheric pressure, such as atmospheric pressure, to the other side of the piston, there is a sufficient differential pressure across the piston to at least assist in moving the piston and the retraction member to the retracted position.

To prevent twisting of the leader during movement to the retracted position, means is provided to prevent relative rotation between the retraction member and the housing. Resilient means can be provided for engaging the piston in one or both of the extended and retracted positions to provide a cushion against shock or impact loading.

The cross-sectional configuration of a portion of the passage means is preferably tailored to the configuration of the leader to maximize the ability of the leader to close off the passage means. In this regard, the tape leader is typically a long, thin strip with parallel edges, and accordingly, such portion of the passage means preferably has a configuration that will be substantially closed off by the leader when the latter is drawn into the port. Thus, the passage means may have parallel, substantially planar side walls spaced apart a distance slightly greater than the width of the leader.

Although the apparatus of this invention is described as a lead tape puller for use in withdrawing a leader from a cassette, it should be understood that it can be used to move various different members which are capable of closing off the port of the retraction member sufficiently to assist in moving the piston and retraction member from one of its positions to the other. Also, the leader or other member may be moved by the pulling apparatus as the piston and retraction member move to either of their positions.

The invention, together with additional features and advantages thereof, may best be understood by reference to the following description taken in connection with the accompanying illustrative drawing.

BRIEF DESCRIPTION OF THE DRAWING

FIG. 1 is a partially schematic sectional view of a lead tape puller constructed in accordance with the teachings of this invention with the piston and retraction member in the extended position adjacent a blank tape cassette.

FIG. 2 is a fragmentary view similar to FIG. 1 showing the withdrawal of the leader into the port of the retraction member.

FIG. 3 is a view similar to FIG. 1 with the piston and retraction member in the retracted position.

FIGS. 4 and 5 are partial and full sectional views, respectively, taken through the lead tape puller on an axial plane.

DESCRIPTION OF THE PREFERRED EMBODIMENT

Figure 6:
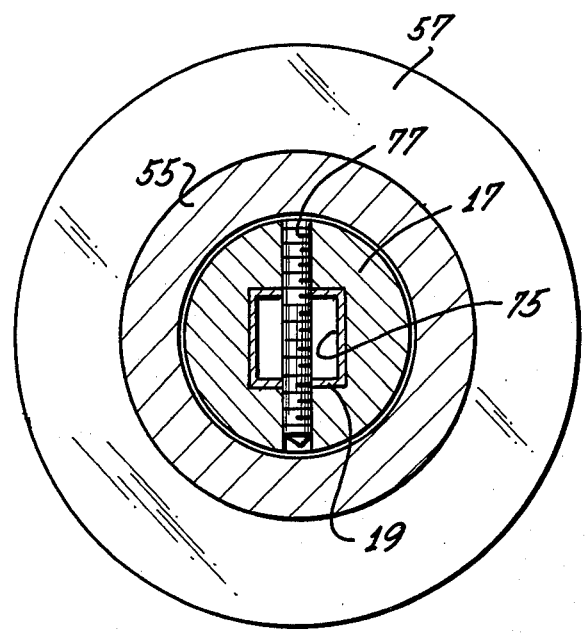
FIGS. 6–9 are sectional views taken on lines 6—6, 7—7, 8—8 and 9—9, respectively, of FIG. 4.
Figure 8:
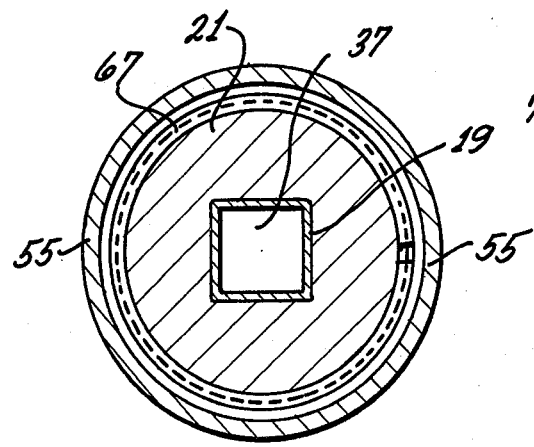

FIGS. 1–3 show a lead tape puller 11 which generally includes a housing 13 having a passage 15 therein, a piston 17 slidable in the passage and a retraction member 19 coupled to the piston and movable with the piston between an extended position shown in FIG. 1 and a retracted position shown in FIG. 3. The housing 13 is elongated and has a transverse wall in the form of an end wall 21 at one end thereof and ports 23 and 25 adjacent the end wall 21 and the opposite end of the housing, respectively.

The piston 17, in the embodiment illustrated, is a double-acting piston and has opposite faces 27 and 29. The piston 17 has a cross section to match the cross-sectional configuration of the passage 15, and in the embodiment illustrated, the passage 15 and the piston 17 are both cylindrical.

The ports 23 and 25 are coupled by conduits 31 and 33, respectively, to sources of air at different pressures through a four-way valve 35. In the embodiment illustrated, two sources are at vacuum or subatmospheric pressure and at vent or ambient air pressure as shown in FIGS. 1 and 3. Accordingly, by operating the valve 35, the piston faces 27 and 29 can be alternately exposed to vacuum and ambient air pressure.

The retraction member 19 is elongated and, in the embodiment illustrated, is coaxial with the piston 17. The retraction member 19 projects from the face 29. Passage means 37, which is best seen in FIG. 5, extends completely through the piston 17 and the retraction member 19. The passage means opens at an opening 39 at the face 27 and in a port 41 at the end of the retraction member remote from the piston 17. The retraction member 19 extends through a bore 43 in the end wall 21.

In the extended position of FIG. 1, the port 41 lies closely adjacent a leader 45 of a blank tape cassette 47. The cassette 47 may be of standard construction and includes spindles or reels 49 rotatably mounted within the cassette. End portions of the leader 45 are wound on one or both of the reels 49, and the opposite ends of the leader are attached to the reels 49, respectively.

In operation, the piston 17 and the retraction member 19 can be advanced to the retracted position of FIG. 1 by moving the valve 35 to the position shown in FIG. 1. In this position, air at atmospheric pressure is supplied to the face 27 of the piston 17, and subatmospheric pressure is communicated to the face 29 of the piston. This differential gas pressure acting across the piston 17 is sufficient to move the piston 17 and the retraction member 19 to the extended position in which the port 41 is closely adjacent the leader 45. For this purpose, the cassette 47 may be appropriately positioned by any suitable holding device (not shown).

As soon as the extended position is reached, the valve 35 is operated, either manually or automatically, to communicate vacuum pressure to the face 27 of the piston and to vent the portion of the passage 15 which contains the piston face 29. The vacuum pressure is applied through the passage means 37 of the piston 17 and the retraction member 19 to the port 41. Accordingly, a section of the leader 45 is drawn through the port 41 as shown in FIG. 2. This closes the passage means 37 to substantially restrict air flow through the passage means 37 from the port 41 to the piston face 27. Consequently, the pressure at the face 27 drops. In addition, to the extent that the passage means 37 is closed by the leader 45, the effective cross-sectional area of the face 27 increases. Accordingly, as soon as the passage means 37 is restricted by the leader 45, there exists a differential fluid pressure across the piston 17 which is sufficient to move the piston and the retraction member 19 to the retracted position of FIG. 3 and to withdraw the leader 45 from the cassette 47. The opposite ends of the leader 45 remain attached to the reels 49.

As shown by way of example in FIGS. 1 and 3, the retraction member 19 may reciprocate along a path which lies between a holder head 51 and a cutter-splicer 53. Both the holder head 51 and the cutter-splicer 53 may be of conventional construction. The holder head 51 holds the leader 45 which has been extracted from the cassette 47, and the cutter-splicer 53 cuts the leader 45 and splices magnetic tape to the opposite ends of the severed sections of the leader 45. The leader and the magnetic tape are then wound on the reels 49, and a new empty cassette 47 is positioned for having its leader extracted from it by the lead tape puller 11.

FIGS. 4–9 show one form of the lead tape puller 11 in greater detail. Thus, the housing 13 includes an elongated tube 55, one end of which is closed by a threaded end cap 57 having a central threaded aperture 59 for receiving a threaded nipple 61 which defines the port 25. The port 23 is defined by a threaded nipple 63 which is threaded into the peripheral wall of the tube 55.

Figure 7:
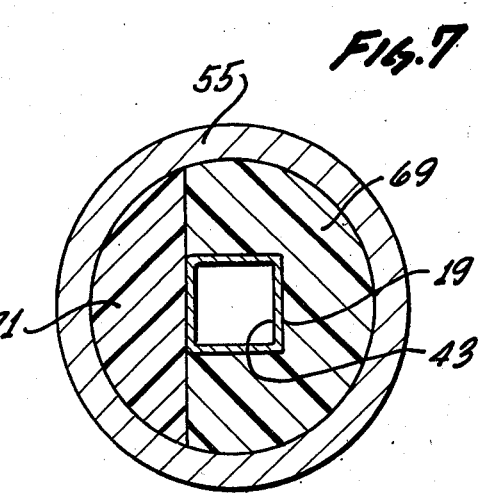
Figure 9:
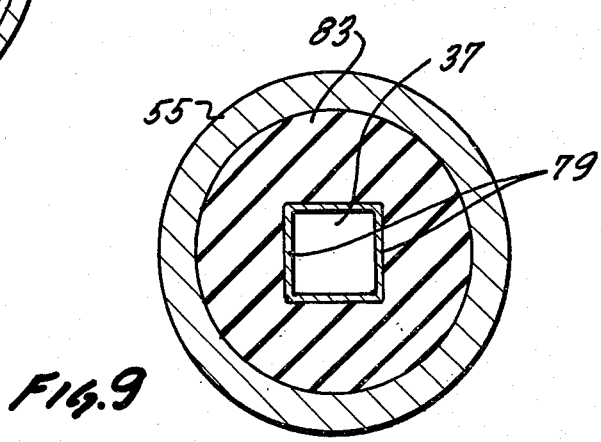

The end of the passage 15 remote from the end cap 57 has a region of enlarged cross-sectional area which defines a shoulder 65 against which the end wall 21 is seated. A retaining ring 67 retains the end wall 21 within the end portion of the passage 15. As shown in FIG. 7, the end wall 21 may comprise a body section 69 and a cover section 71 held together by the tube 55. The body section 69 has a channel and cooperates with the cover section 71 to define the bore 43 which, in the embodiment illustrated, is square in cross section. The retraction member 19 has a matching square cross section so that the retraction member 19 and the piston 17 cannot rotate relative to the housing 13. Of course, cross sections of other non-circular configurations can be used for the bore 43, and other means, such as pins or spines, could be used, if desired, to prevent such relative rotation.

The piston 17 is in the form of a relatively short, thick-walled tube having an axial bore 75. The inner end of the retraction member 19 is received within the bore 75 and is suitably attached to the piston 17 as by a threaded fastener 77 which extends transversely through the piston 17 and the retraction member 19 as shown in FIGS. 5 and 6.

As shown in FIGS. 6–9, the portion of the passage means 37 which lies within the retraction member 19 is of generally square cross section. The leader 45 is an elongated strip with parallel longitudinal edges. The passage 37 has parallel, substantially planar side walls 79 which are spaced apart a distance slightly greater than the width of the leader 45. Thus, by orienting the port 41 so that the opposite longitudinal edges of the leader 45 are generally parallel to the side wall 79, the leader 45 can substantially completely close off the passage means 37 when it is drawn through the port 41 as shown in FIG. 2.

Resilient pads 81 and 83 of rubber are provided at the opposite ends of travel for the piston 17 to provide a shock-absorbing effect for the piston 17 and the retraction member 19 and to provide a seal around the member 19. In the embodiment illustrated, the pad 81 is retained between the left end (as viewed in FIG. 5) of the tube 55 and the end wall of the cap 57. The pad 83 is retained between the shoulder 65 and the end wall 21. The pad 81 has an aperture 85 to provide communication between the nipple 61 and the passage 15, and the pad 83 is located closely adjacent the nipple 63, with the nipple 63 being intermediate the two pads. A porous restriction in the form of a screen 87 is positioned within the portion of the passage means which is within the retraction member 19 and within the piston 17. The porous restriction 87 forms a stop which prevents the tape leader 45 from being drawn completely through the passage means 37 while at the same time allowing the pressure existing at the opening 39 to be transmitted, with some pressure drop, to the port 41. The porous restriction 87 may be of any construction which provides these functions and can be located at virtually any position along the passage means 37.

Preferably, the region of the passage means 37 adjacent the port 41 is flared outwardly as it extends toward the port 41. This provides the port 41 with a somewhat larger cross-sectional area than other regions of the passage means 37. Because of the increased dimensions of the port 41, alignment of the retraction member 19 with the cassette 47 becomes less critical. Also, because of the increased dimensions of the port 41, deflection of the retraction member 19 due to its being cantilevered creates no misalignment problems with the tape leader 45. Of course, the degree to which the cross-sectional area of the port is increased, and the manner for achieving such increase can be determined by those skilled in the art.

Although an exemplary embodiment of the invention has been shown and described, many changes, modifications and substitutions may be made by one having ordinary skill in the art without necessarily departing from the spirit and scope of this invention.

We claim:

1. A method of moving a movable element comprising:
   providing a moving apparatus which includes a housing, a passage in the housing, a piston slidable in the passage of the housing, a member coupled to said piston and movable with said piston between extended and retracted positions and passage means in said piston and said member opening on one side of said piston and having a port in the member which provides communication between the interior of the passage means and the exterior of the member on the other side of the piston;
   moving said piston and said member to one of said positions with the port being adjacent the movable element;
   applying subatmospheric pressure to said one side of the piston and through said passage means to tend to draw air through the port and the passage means to said one side of the piston and to tend to pull the movable element toward said port;
   at least partially closing said passage means with said movable element to restrict air flow through said passage means to said one side of said piston to thereby reduce the pressure on said one side of the piston; and
   applying a pressure greater than said subatmospheric pressure to said other side of the piston whereby said subatmospheric pressure and said pressure greater than said subatmospheric pressure create a differential pressure across the piston to at least assist in moving the piston and the member to the other of said positions.

2. A method as defined in claim 1 wherein said step of moving includes applying a differential fluid pressure across said piston to at least assist in moving said piston to said one position.

3. A method as defined in claim 1 including substantially preventing rotation of the piston and the member relative to the housing as they move between the extended and retracted positions.

4. A method as defined in claim 1 wherein the movable element is flexible and has generally parallel longitudinal edges and a portion of said passage means adjacent said port has parallel substantially planar side walls, said step of closing includes pulling the flexible element through said port and into said passage means with the subatmospheric pressure with the longitudinal edges being closely adjacent the side walls.

5. A method as defined in claim 1 including providing a tape cassette with the movable element at least partially within the cassette, said movable element including a tape leader.

6. A method as defined in claim 1 or 5 wherein said one position in said extended position and said other position is said retracted position.

7. A lead tape puller comprising:
   a housing having a passage therein;
   a piston slidable in the passage of the housing;
   a retraction member coupled to said piston and movable with the piston between extended and retracted positions, said retraction member extending out of said passage at least when said piston and said retraction member are in said extended position;
   passage means in said piston and said retraction member, said passage means opening on one side of said piston and having a port in the retraction member on the other side of the piston which provides communication between the interior of the passage means and the exterior of the retraction member, said passage means providing communication between the opening on said one side of the piston and the port on said other side of the piston; and
   said housing having ports communicating with said passage of the housing on opposite sides of the piston whereby a differential fluid pressure can be applied across said piston and a subatmospheric pressure can be applied to said one side of said piston and through said passage means to said port of said retraction member.

8. A lead tape puller as defined in claim 7 wherein a cross-sectional area of said port is greater than the cross-sectional area of said passage means adjacent to said port.

9. A lead tape puller as defined in claim 7 wherein said port of said retraction member is rectangular in axial cross section.

10. A lead tape puller as defined in claim 7 wherein said retraction member has a section of non-circular cross section and said housing includes a transverse wall having a bore of non-circular cross section, said bore slidably receiving said section of said retraction member to prevent rotation of the retraction member relative to said housing.

11. A lead tape puller as defined in claim 7 wherein said passage and said retraction member are each elongated, said retraction member terminates in an end remote from the piston, and said port of said retraction member is at said end.

12. A lead tape puller as defined in claim 7 including resilient means for engaging said piston in one of said positions of said piston and said retraction member to define said one position of said piston and said retraction member and for sealing around the retraction member.

13. A lead tape puller as defined in claim 7 including a first fluid source at subatmospheric pressure and a second fluid source at a pressure greater than said subatmospheric pressure and valve means for selectively providing communication between said first and second sources and said ports of said housing.

14. A lead tape puller as defined in claim 13 wherein said passage and said retraction member are each elongated, said retraction member terminates in an end remote from the piston, and said port of said retraction member is at said end, and including means for preventing relative rotation between the retraction member and the housing.

15. An apparatus for moving a movable element comprising:
   a housing having a passage therein;
   a piston slidable in the passage of the housing;
   a connecting member coupled to said piston and movable with the piston;
   passage means in said piston and said connecting member, said passage means opening on one side of said piston and having a port in the connecting member on the other side of the piston;
   means for applying subatmospheric pressure to said one side of said piston to tend to draw the movable element toward the port;
   means for applying pressure greater than said subatmospheric pressure to said other side of said piston; and
   valve means comprising said movable element and at least a portion of said passage means and responsive to the application of subatmospheric pressure to said one side of said piston to restrict said port to reduce the pressure acting on said one face of the piston whereby a differential pressure is created across the piston to move the piston, the connecting member, and the movable element.

16. An apparatus as defined in claim 15 wherein said movable element includes a tape leader.

17. An apparatus as defined in claim 14 wherein the subatmospheric pressure draws the movable element through the port and into the passage means and said apparatus includes a porous restriction in said passage means for preventing movement of the movable element completely through said passage means.

* * * * *

UNITED STATES PATENT AND TRADEMARK OFFICE
CERTIFICATE OF CORRECTION

PATENT NO. : 4,432,505
DATED : Feb. 21, 1984
INVENTOR(S) : Edward W. Honeywell and Joseph C. Honeywell It is certified that error appears in the above—identified patent and that said Letters Patent is hereby corrected as shown below:

Column 6, line 18 - "in" change to -- is --.

Column 8, line 17 - change "claim 14" to -- claim 16 --.

Signed and Sealed this

Eighth Day of May 1984

[SEAL]

Attest:

GERALD J. MOSSINGHOFF

Attesting Officer

Commissioner of Patents and Trademarks